United States Patent
Suzuki

(10) Patent No.: US 9,351,384 B2
(45) Date of Patent: May 24, 2016

(54) LIGHT SOURCE DRIVE DEVICE, DISPLAY APPARATUS, AND LIGHT SOURCE DRIVE METHOD

(71) Applicant: SEIKO EPSON CORPORATION, Tokyo (JP)

(72) Inventor: Junichi Suzuki, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 144 days.

(21) Appl. No.: 14/155,758

(22) Filed: Jan. 15, 2014

(65) Prior Publication Data

US 2014/0218696 A1     Aug. 7, 2014

(30) Foreign Application Priority Data

Feb. 5, 2013   (JP) ................. 2013-020172

(51) Int. Cl.
  *G03B 21/20*   (2006.01)
  *H05B 41/38*   (2006.01)
  *H05B 41/292*  (2006.01)

(52) U.S. Cl.
  CPC ............ *H05B 41/38* (2013.01); *G03B 21/2053* (2013.01); *H05B 41/2928* (2013.01); *Y02B 20/208* (2013.01)

(58) Field of Classification Search
  CPC ........ H05B 41/00; H05B 41/24; H04B 41/38; G03B 21/20
  See application file for complete search history.

(56) References Cited

U.S. PATENT DOCUMENTS

| 2004/0000880 | A1 | 1/2004 | Ozasa et al. |
| 2010/0084987 | A1 | 4/2010 | Yamauchi et al. |
| 2011/0128508 | A1* | 6/2011 | Yamada ............. H05B 41/2883 353/85 |
| 2012/0074858 | A1 | 3/2012 | Ono et al. |

FOREIGN PATENT DOCUMENTS

| CN | 102474961 A | 5/2012 |
| JP | A-2007-115534 | 5/2007 |
| JP | A-2010-114064 | 5/2010 |
| JP | 2012-014995 | * 1/2012 |
| JP | A-2012-14995 | 1/2012 |

OTHER PUBLICATIONS

Nov. 9, 2015 extended European Search Report issued in European Patent Application No. 14152798.6.

* cited by examiner

*Primary Examiner* — Sultan Chowdhury
*Assistant Examiner* — Danell L Owens
(74) *Attorney, Agent, or Firm* — Oliff PLC

(57) ABSTRACT

A light source drive device includes a supply unit that supplies a high-frequency first drive signal and a second drive signal whose frequency is lower than a frequency of the first drive signal to a discharge lamp which has a pair of electrodes, and a control unit that controls the supply unit so that the second drive signal is supplied during a second period after the first drive signal is supplied during a first period and the second period is lengthened as a voltage between the pair of electrodes is increased. It is preferable that the second period be longer than two minutes.

8 Claims, 5 Drawing Sheets

| INTER-ELECTRODE VOLTAGE Vd (V) | LENGTH OF PERIOD B (min) |
|---|---|
| $Vd \leq 75$ | 5 |
| $75 < Vd \leq 85$ | 10 |
| $85 < Vd \leq 95$ | 15 |
| $95 < Vd \leq 105$ | 20 |
| $105 < Vd \leq 115$ | 25 |
| $115 < Vd \leq 125$ | 30 |
| $125 < Vd \leq 135$ | 35 |
| $135 < Vd \leq 145$ | 40 |
| $145 < Vd$ | 45 |

FIG. 7

| | TIME Th(h) TAKEN UNTIL ILLUMINANCE BECOMES 50% OF ILLUMINANCE AT LIGHTING INITIATION TIME |
|---|---|
| EMBODIMENT | 10000 |
| COMPARATIVE EXAMPLE | 7000 |

LIGHT SOURCE DRIVE DEVICE, DISPLAY APPARATUS, AND LIGHT SOURCE DRIVE METHOD

BACKGROUND

1. Technical Field

The present invention relates to a technique for driving a discharge lamp.

2. Related Art

Display apparatuses, such as projectors, using a discharge lamp such as a high-pressure mercury lamp as a light source are known. In such display apparatuses, a stable operation of the light source is one of factors to determine the quality of displayed images. JP-A-2007-115534 discloses a technique for supplying electromagnetic waves into an electric discharge container via an antenna and preventing the electric discharge container from melting. JP-A-2010-114064 discloses a technique for suppressing the electrode from melting by performing a control for changing a ratio between the electric energy of a period in which one of two electrodes in the discharge lamp is operated as a positive electrode and the electric energy of a period in which the electrode is operated as a negative electrode at a specific timing. JP-A-2012-14995 discloses a technique for repeating three periods during which alternating current of different frequencies is supplied in a predetermined sequence and maintaining a state of an electrode tip.

SUMMARY

An advantage of some aspects of the invention is to provide a technique for suppressing a reduction in the service life of a discharge lamp.

An aspect of the invention is directed to a tight source drive device including a supply unit that supplies a high-frequency first drive signal and a second drive signal whose frequency is lower than a frequency of the first drive signal to a discharge lamp which has a pair of electrodes, and a control unit that controls the supply unit so that the second drive signal is supplied during a second period after the first drive signal is supplied during a first period and the second period is lengthened as a voltage between the pair of electrodes is increased. According to the light source drive device, a reduction in the service life of the discharge lamp can be suppressed when compared to a case where the second period is fixed.

In a preferred aspect of the invention, the second period is longer than two minutes. According to the light source drive device of this configuration, an irregular change in the shape of the electrodes can foe suppressed when compared to a case where the second period is two minutes or less.

In another preferred aspect of the invention, the second period is at least five minutes. According to the light source drive device of this configuration, the irregular change in the shape of the electrodes can be suppressed when compared to a case where the second period is shorter than five minutes.

In another preferred aspect of the invention, the first period is fixed. According to the light source drive device of this configuration, the reduction in the service life of the discharge lamp can be suppressed without having to change the first period.

In another preferred aspect of the invention, the frequency of the first drive signal is at least 1 kHz. According to the light source drive device of this configuration, the reduction in the service life of the discharge lamp is suppressed in the second period.

In another preferred aspect of the invention, the second drive signal has a plurality of frequency periods. According to the light source drive device of this configuration, heat generated in the discharge lamp can be stirred when compared to a case where the second drive signal has only a single frequency component.

Another aspect of the invention is directed to a display apparatus including a discharge lamp that includes a pair of electrodes, a supply unit that supplies a high-frequency first drive signal and a second drive signal whose frequency is lower than a frequency of the first drive signal to the discharge lamp, a control unit that controls the supply unit so that the second drive signal is supplied during a second period after the first drive signal, is supplied during a first period and the second period is lengthened as a voltage between the pair of electrodes is increased, and an optical modulator that modulates light which is output from the discharge lamp according to image data. According to the display apparatus, a reduction in the service life of the discharge lamp can be suppressed when compared to a case where the second period is fixed.

Still another aspect of the invention is directed to a light source drive method including supplying a high-frequency first drive signal to a discharge lamp that has a pair of electrodes during a first period, detecting a voltage between the pair of electrodes, supplying a second drive signal whose frequency is lower than a frequency of the first drive signal for a second period, and determining the second period based on the voltage between the pair of electrodes so that the second period is lengthened as the voltage between the pair of electrodes is increased. According to the light source drive method, a reduction in the service life of the discharge lamp can be suppressed when compared to a case where the second period is fixed.

BRIEF DESCRIPTION OF THE DRAWINGS

The invention will be described with reference to the accompanying drawings, wherein like numbers reference like elements.

FIG. 7 is a view showing an example of an association between the inter-electrode voltage and a period B.

DESCRIPTION OF EXEMPLARY EMBODIMENTS

1. Overview

Figure 1:
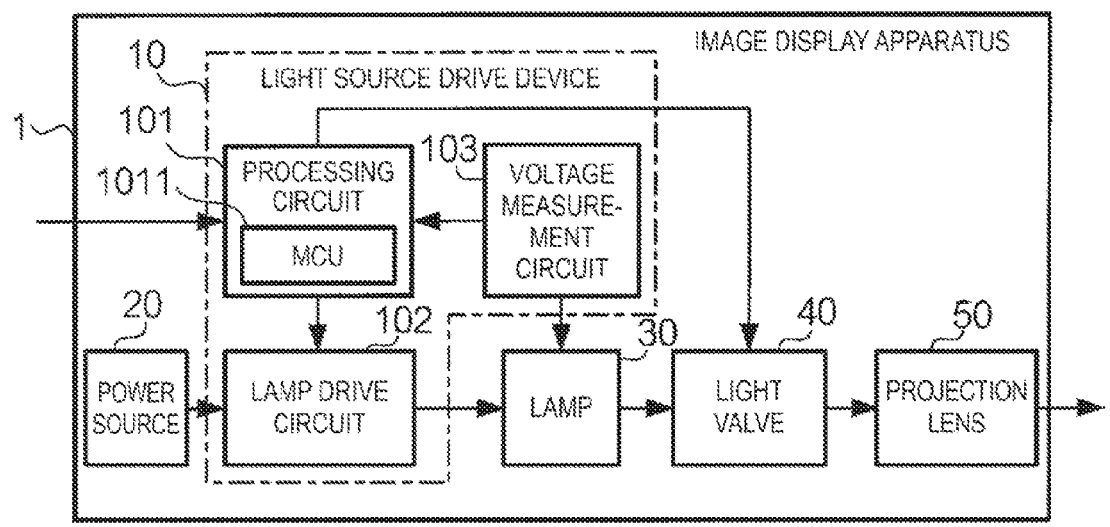
FIG. 1 is a view showing a hardware configuration of an image display apparatus.

FIG. 1 is a view showing a hardware configuration of an image display apparatus 1 according to an embodiment. In this example, the image display apparatus 1 is an apparatus that projects an image according to an image signal which is input onto a screen (not shown), that is, a projector. The image display apparatus 1 includes a light source drive device 10, a power source 20, a lamp 30 (light source), a light valve 40, and a projection lens 50. The lamp 30 is a discharge lamp that is the light source of the image which is projected, examples of which include a high-pressure mercury lamp.

Figure 2:
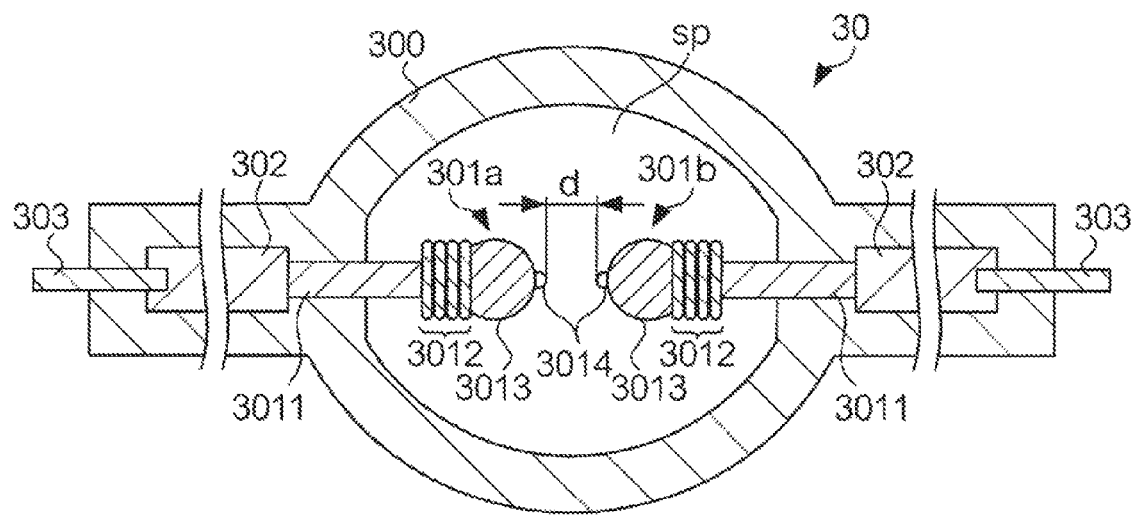
FIG. 2 is a schematic view showing a structure of a lamp.

FIG. 2 is a schematic cross-sectional view showing a structure of the lamp 30, The lamp 30 has a container 300, a pair of electrodes 301 (301a and 301b), a connection member 302, and a terminal 303. The container 300 is a member that accommodates each section of the lamp 30, and has a space sp therein. High-pressure mercury gas is sealed in the space sp. The container 300 is formed of glass such as quartz glass, optically transparent ceramics, or the like. The electrodes 301a and 301b are provided in the space sp. The electrodes 301a and 301b face each other. A distance between the electrodes 301a and 301b (hereinafter referred to as an "inter-electrode distance d") is, for example, 1 μm to 5 mm. The electrodes 301 have core rods 3011, coil sections 3012, end sections 3013, and protrusions 3014. In the electrode 301, an electrode wire such as tungsten is wound around the core rod 3011 to form the coil section 3012, and the end section 3013 is formed by heating and melting the coil section 3012. The end section 3013 is an area with a large heat capacity. The protrusion 3014 is not formed when the lamp 30 has never been turned on, but is formed when an alternating current (drive signal) is supplied to the electrode 301. The protrusion 3014 is maintained even after the lamp 30 is turned off. The connection member 302 is a conductive member that connects the electrodes 301 with the terminal 303. The terminal 303 is a terminal that supplies a current to the electrodes 301.

Referring back to FIG. 1, the power source 20 supplies a direct current to the light source drive device 10. The light source drive device 10 is a device that turns on the lamp 30. The light source drive device 10 has a processing circuit 101, a lamp drive circuit 102, and a voltage measurement circuit 103. The processing circuit 101 controls each section of the light source drive device 10. In this example, the processing circuit 101 has a micro control unit (MCU) 1011. The MCU 1011 controls each section of the light source drive device 10 and performs image processing on the image signal which is input. The MCU 1011 outputs the image-processed image signal to the light valve 40. The lamp drive circuit 102 is a circuit that generates an alternating current by switching the polarity of the direct current which is supplied from the power source 20 to positive or negative and supplies the generated alternating current to the lamp 30. The voltage measurement circuit 103 measures a voltage between the electrode 301a and the electrode 301b (hereinafter referred to as an "inter-electrode voltage Vd").

The light valve 40 is a device that modulates light generated by the lamp 30 according to the image signal which is supplied from the MCU 1011, examples of which include a liquid crystal panel. The projection lens 50 is a lens that projects the image which is shown by the light modulated by the light valve 40 onto the screen.

The service life of the lamp 30, that is, the high-pressure mercury lamp is one of factors to determine the quality of the image display apparatus 1. Two main factors to determine the service life of the high-pressure mercury lamp are as follows.
 (a) Change in the inter-electrode distance d
 (b) Blackening and devitrification phenomena in the container 300
Hereinafter, each of the phenomena will foe described.

1-1. Change in Inter-Electrode Distance Between Facing Electrodes

When the high-pressure mercury lamp remains turned on, the electrode 301 (end section 3013 and protrusion 3014) in the container 300 is melted and the inter-electrode distance d is lengthened. When the inter-electrode distance d is lengthened, the form of arc discharge becomes elongated (that is, the shape of a light emitting section becomes elongated). When the shape of a light emitting section becomes elongated, the luminous flux that is output through an entire optical system of the projector to a projection surface is reduced. As a result, the brightness of the image that is displayed is reduced.

One of methods for suppressing the lengthening of the inter-electrode distance d is to supply a low-frequency (for example, frequency of lower than 1 kHz) alternating current to the high-pressure mercury lamp. It is known that, when the high-pressure mercury lamp is driven by using the low-frequency alternating current, the electrode is repeatedly melted and solidified and the inter-electrode distance d is shortened through recovery. In this case, there is a case where high-pressure gas in the mercury lamp is thermally stirred by providing a drive frequency with regular fluctuations (that is, by using a drive signal that has a plurality of frequency components).

1-2. Blackening and Devitrification Phenomena in Container

During the use of the high-pressure mercury lamp, a scattering material from the electrode 301 is attached into the container 300 with the elapse of the cumulative time of use. As a result, the container 300 is gradually blackened inside. The blackening phenomenon causes the temperature of the container 300 to rise as the light transmittance of the container 300 is reduced and the light is changed into heat on a surface of the container 300. As a result, the devitrification phenomenon in which the container 300 becomes cloudy occurs and, in addition, the reduction of the light transmittance is accelerated. One of known methods for suppressing the blackening and devitrification of the container 300 is to supply a high-frequency (for example, frequency of at least 1 kHz) alternating current to the high-pressure mercury lamp.

1-3. Problem in Driving the Mercury Lamp

As already described, each of the change in the inter-electrode distance d and the blackening and devitrification phenomena can be suppressed by changing the frequency of the alternating current that is supplied. However, the alternating currents conflict with each other in that the alternating current that suppresses the change in the inter-electrode distance d is of a low frequency and the alternating current that suppresses the blackening and devitrification is of a high frequency. The lamp drive circuit 102 alternately supplies the conflicting alternating currents to the lamp 30.

Figure 3:
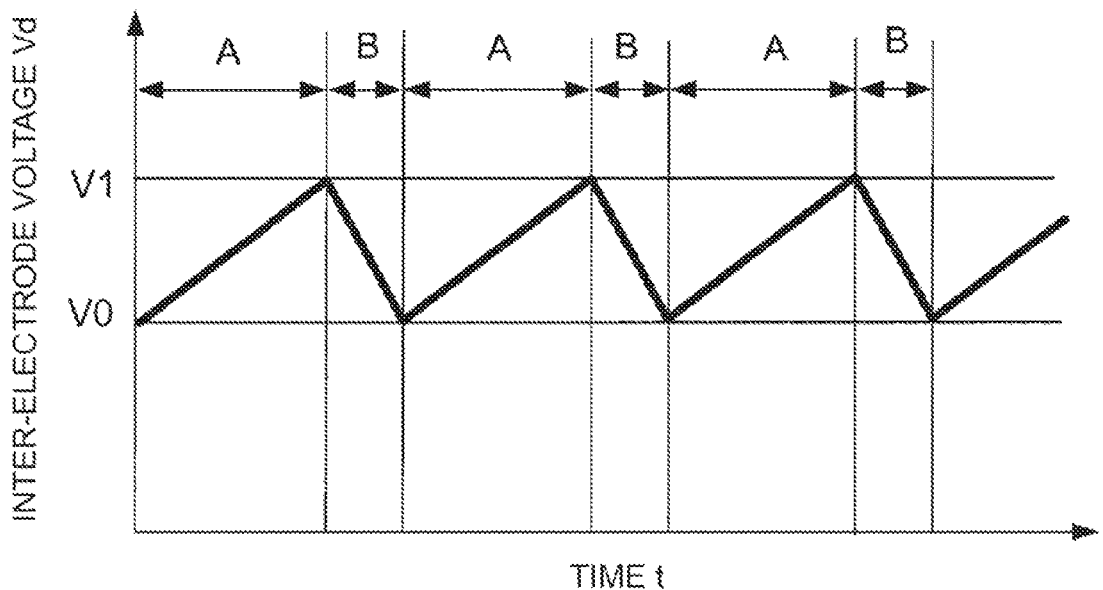
FIG. 3 is a view showing a change in an inter-electrode, voltage.

FIG. 3 is a view showing an example of a change in the inter-electrode voltage Vd its a case where the high-frequency alternating current and the low-frequency alternating current are alternately supplied. In FIG. 3, the horizontal axis represents time t and the vertical axis represents the inter-electrode voltage Vd. In this example, the lamp 30 is driven by a constant current (constant effective current) and the inter-electrode voltage Vd is proportional to the inter-electrode distance d. In other words, the inter-electrode voltage Vd being high represents the inter-electrode distance d being long, and the inter-electrode voltage Vd being low represents the inter-electrode distance a being short. A period A represents a period when the high-frequency alternating current is supplied by the lamp drive circuit 102. in the period A, the inter-electrode voltage Vd increases (the inter-electrode distance d is lengthened) with the elapse of the time. A period B represents time during which the low-frequency alternating current is supplied by the lamp drive circuit 102. In the period B, the inter-electrode voltage Vd decreases (the inter-electrode distance d is shortened) with the elapse of the time. FIG. 3 shows an ideal change in the inter-electrode voltage Vd in a case where each of the period A and the period B is driven during a fixed amount of time. As shown in FIG. 3, when the durations of the period A and the period B are optimised, the inter-electrode voltage Vd that rises to V1 in the period A returns to V0 in the period B. In other words, the inter-electrode distance d that is lengthened in the period A is returned to the original length through recovery in the period B. In this manner, when the low-frequency alternating current and the high-frequency alternating current are alternately supplied, each of the change in the inter-electrode distance d and the blackening and devitrification phenomena is suppressed.

However, in many cases, it is difficult to optimize the durations of the period A and the period B in individual products, and there is a case where the rate of change in the inter-electrode distance d is changed with the elapse of the cumulative time of use. Accordingly, in many cases, it is difficult to always maintain the time ratio between the period A and the period B in an optimal state. The image display apparatus 1 according to the embodiment copes with the change in the inter-electrode distance d and the blackening and devitrification phenomena of the lamp 30 by the processing described below.

The lamp drive circuit 102 is an example of a supply unit that supplies a high-frequency first drive signal and a second drive signal whose frequency is lower than the frequency of the first drive signal to the discharge lamp (lamp 30) which has the pair of electrodes. The MCU 1011 is an example of a control unit that controls the lamp drive circuit 102 so that the second drive signal is supplied during the second period after the first drive signal is supplied during the first period and the second period is lengthened as the voltage between the pair of electrodes is increased.

2. Operation

Figure 4:
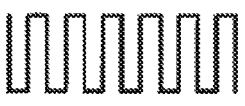
FIG. 4 is an exemplary view of a drive signal.
Figure 5:
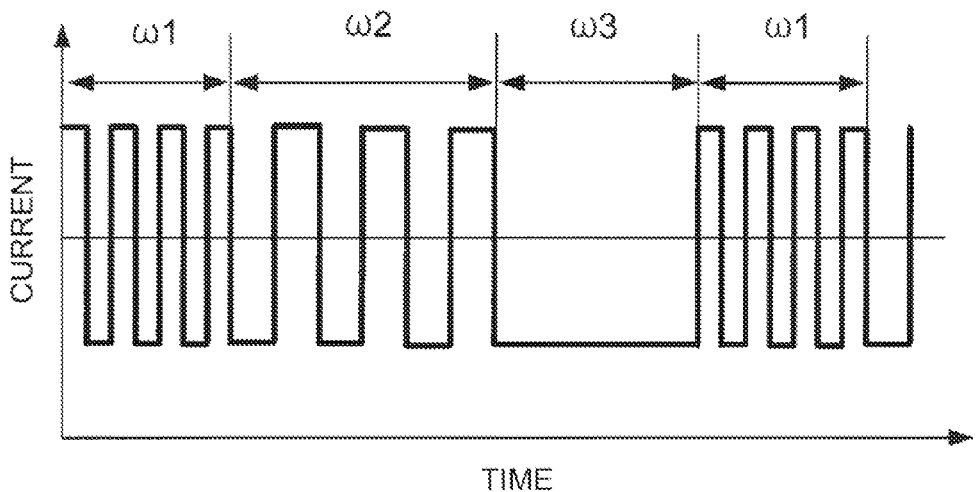
FIG. 5 is an exemplary view of a frequency component of the drive signal.

FIG. 4 is an exemplary view of the drive signal used in the embodiment. In this example, the lamp drive circuit 102 selectively supplies either one of two types of drive signals, that is, a high-frequency drive signal i1 and a low-frequency drive signal i2, to the lamp 30. The high frequency refers to, for example, a frequency of at least 1 kHz and the low frequency refers to, for example, a frequency of lower than 1 kHz. The drive signal i1 is a signal that is used to suppress (or reduce) the blackening and devitrification in the container 300. The drive signal i2 is a signal that is used to recover the lengthened inter-electrode distance d (or to maintain the inter-electrode distance d). In this example, the drive signal i2 has a plurality of frequency components that include a direct current component, FIG. 5 is an exemplary view of the frequency component of the drive signal i2. In FIG. 5, the vertical axis represents the current and the horizontal axis represents the time. In this example, the drive signal i2 includes a frequency $\omega 1$ period, a frequency $\omega 2$ period, and a frequency $\omega 3$ period. The frequency $\omega 3$ period is just half-period long ($1/\omega 3/2$), and thus the polarity of the current does not change in this period. Herein, this is referred to as the direct current component. In the drive signal i2, the frequency $\omega 1$ period, the frequency $\omega 2$ period, and the frequency $\omega 3$ period are repeated. In the frequency $\omega 3$ period, a positive current period and a negative current period are switched in each cycle.

Figure 6:
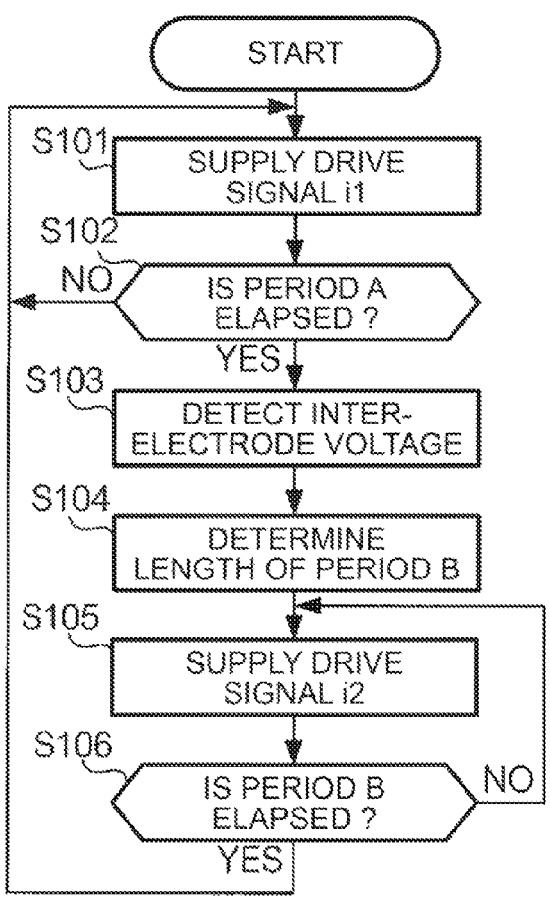
FIG. 6 is a flowchart showing an operation of the image display apparatus.

FIG. 6 is a flowchart showing an operation of the image display apparatus 1. The flow in FIG. 6 is initiated as, for example, the power source of the image display apparatus 1 is applied. In step S101, the MCU 1011 controls the lamp drive circuit 102 so that the drive signal i1 is supplied to the lamp 30. In step S102, the MCU 1011 determines whether the period A is elapsed or not. Specifically, the MCU 1011 measures the elapsed time since the supply of the drive signal i1 by using a timer which is built into the light source drive device 10 and determines whether the elapsed time exceeds the period A. The length of the period A is constant (for example, 15 minutes). In a case where the period A is determined to foe elapsed (step S102: Yes), the MCU 1011 moves the processing to step S103. In a case where the period A is determined not to be elapsed (step S102: No), the MCU 1011 moves the processing to step S101.

In step S103, the MCU 1011 detects the inter-electrode voltage Vd. Specifically, the MCU 1011 samples a signal representing the inter-electrode voltage Vd from the voltage measurement circuit 103. In step S104, the MCU 1011 determines the length of the period B. The MCU 1011 stores data in which the inter-electrode voltage yd and the length of the period B are associated with each other in a memory which is built into the MCU 1011. The MCU 1011 determines the length of the period B based on the data.

FIG. 7 is a view showing an example of the association between the inter-electrode voltage Vd and a period B. The length of the period B is determined according to a value of the inter-electrode voltage Vd that is detected in step S103. The length of the period B is preferably longer than two minutes and more preferably at least five minutes from the viewpoint of suppressing an irregular change in the shape of the protrusion 3014. In the example of FIG. 7, the shortest length of the period B is five minutes. In FIG. 7, in a case where the inter-electrode voltage Vd is 75 V or lower, the length of the period B is determined to be five minutes. In a case where the inter-electrode voltage Vd is higher than 75 V and equal to or lower than 85 V, the length of the period B is determined to be 10 minutes. In a case where the inter-electrode voltage Vd is higher than 145 V, the length of the period B is determined to be 45 minutes. As shown in FIG. 7, the MCU 1011 lengthens the period B as the inter-electrode voltage Vd is increased.

Referring back to FIG. 6, in step S105, the MCU 1011 controls the lamp drive circuit 102 so that the drive signal i2 is supplied to the lamp 30. In step S105, the MCU 1011 determines whether the period B determined in step 3104 is elapsed or not. Specifically, the MCU 1011 measures the elapsed time since the supply of the drive signal i2 by using a timer and determines whether the elapsed time exceeds the period B. In a case where the period B is determined to be elapsed (step S106: Yes), the MCU 1011 moves the processing to step S101. In a case where the period B is determined not to foe elapsed (step S106: No), the MCU 1011 moves the processing to step S105.

According to the embodiment, the length of the period B during which the drive signal i2 is supplied increases as the inter-electrode voltage Vd increases. Accordingly, even in a case where the inter-electrode distance a is lengthened by turning on the lamp 30 for a long period of time (hundreds of hours or thousands of hours), the length of the period B is determined according to the inter-electrode distance d. In other words, it is possible to suppress a reduction in the service life of the light source when compared to a case where the length of the period A and the length of the period B are fixed.

3. Embodiment

Next, a specific embodiment of the invention will be described. Herein, the image display apparatus 1 that has the following configuration is used.

EMBODIMENT

Material constituting the container of the discharge lamp; Quartz glass
Material sealed in the discharge lamp: Mercury
Atmospheric pressure in the discharge lamp that is turned on: 200 atm
Material constituting the electrode: Tungsten
Rated power: 230 W
Inter-electrode voltage at the lighting initiation time: 70 V
Frequency of the drive signal i1: 3.5 kHz
Waveform of the drive signal i1: Rectangular form
Period A: 15 minutes
Frequency of the drive signal i2: Having the plurality of frequency components of 300 Hz or less
Waveform of the drive signal i2: Rectangular form
Period B: Adjusted to the length shown in FIG. 7 according to the value of the inter-electrode voltage

COMPARATIVE EXAMPLE

The comparative example is the same as the embodiment with the only exception that the period B is fixed at five minutes.

Figures 8A, 8B:
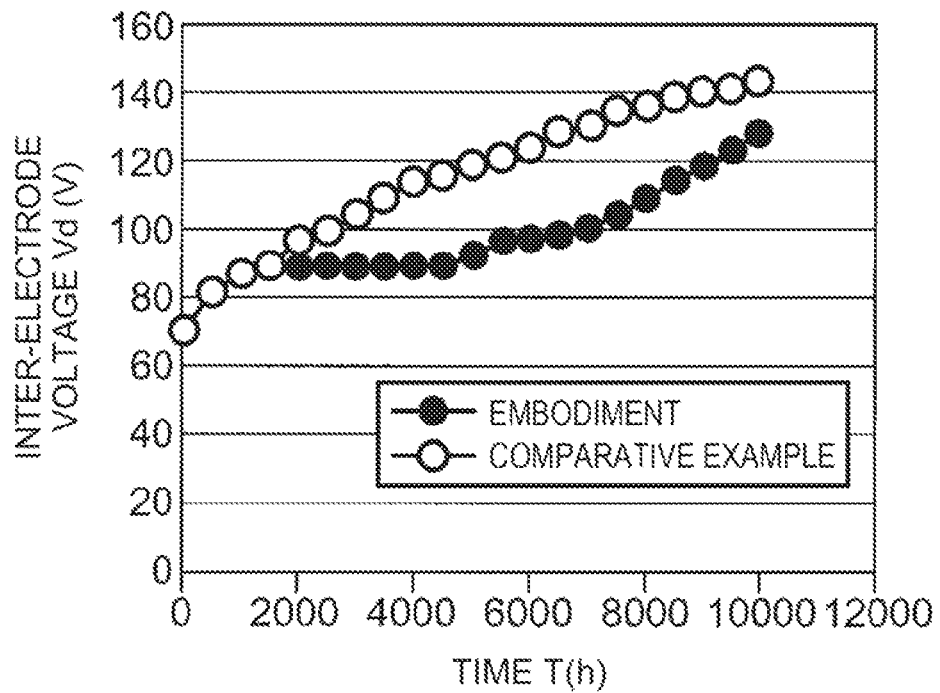
FIGS. 8A and 8B are views showing test results of an embodiment and a comparative example.

FIGS. 8A and 8B are views showing test results of the embodiment and the comparative example. FIG. 8B shows the change with time in the inter-electrode voltage Vd. In FIG. 8A, the horizontal axis represents the cumulative time T[h] during which the high-pressure mercury lamp is turned on and the vertical axis represents the inter-electrode voltage Vd [V]. In FIG. 8A, the white circle represents the comparative example and the black circle represents the embodiment. As shown in FIG. 8A, in the embodiment, a rise in the inter-electrode voltage Vd is suppressed when compared to the comparative example and a reduction in the brightness of the high-pressure mercury lamp is suppressed. Also, FIG. 8B shows time Th taken until the illuminance of the discharge lamp becomes 50% of the illuminance at the lighting initiation time. As shown in FIG. 8B, the time Th is 10,000 hours in the embodiment and the time Th is 7,000 hours in the comparative example. The time taken until the reduction in the illuminance is longer in the embodiment than in the comparative example.

4. Modification Example

The invention is not limited, to the above-described embodiment but various modifications are possible. Hereinafter, several modification examples will be described. Two or more of the following modification examples may be used in combination.

The structure of the lamp 30 is not limited to the above-described embodiment. For example, the lamp 30 is the high-pressure mercury lamp in the above-described embodiment, but the lamp 30 may be a discharge lamp other than the high-pressure mercury lamp such as a metal halide lamp.

The high-frequency drive signal i1 has only a single frequency component in the above-described embodiment, but the drive signal if may have a plurality of frequency components. Also, specific examples of the drive signal i2 are not limited to what is described in the embodiment. For example, the drive signal i2 may have two or at least four frequency components and may have only a single frequency component.

The length of the period A shown in the embodiment is an example and the length of the period A is not limited thereto. Also, the length of the period B is not limited to the length shown in FIG. 7. The length of the period B may be different from the length shown in FIG. 7 if the length of the period B is increased as the inter-electrode voltage Vd is increased.

The operation of the image display apparatus 1 is not limited to the operation shown in FIG. 6. For example, the timing when the inter-electrode voltage Vd is detected is not limited to the final stage of the period A. The detection of the inter-electrode voltage Vd may be performed at any timing during the period A.

The image display apparatus 1 is not limited to the projector. The image display apparatus 1 may be a device other than the projector if the discharge lamp is used as the light source.

The entire disclosure of Japanese Patent Application No. 2013-020172, filed Feb. 5, 2013 is expressly incorporated by reference herein.

What is claimed is:

1. A light source drive device comprising:
a supply unit that supplies a high-frequency first drive signal and a second drive signal whose frequency is lower than a frequency of the first drive signal to a discharge lamp which has a pair of electrodes; and
a control unit that controls the supply unit so that the second drive signal is supplied during a second period after the first drive signal is supplied during a first period and the second period is lengthened as a voltage between the pair of electrodes is increased.

2. The light source drive device according to claim 1, wherein the second period is longer than two minutes.

3. The light source drive device according to claim 2, wherein the second period is at least five minutes.

4. The light source drive device according to claim 1, wherein the first period is fixed.

5. The light source drive device according to claim 1, wherein the frequency of the first drive signal is at least 1 kHz.

6. The light source drive device according to claim 1, wherein the second drive signal has a plurality of frequency periods.

7. A display apparatus comprising:
a discharge lamp that includes a pair of electrodes;
a supply unit that supplies a high-frequency first drive signal and a second drive signal whose frequency is lower than a frequency of the first drive signal to the discharge lamp;
a control unit that controls the supply unit so that the second drive signal is supplied during a second period after the first drive signal is supplied during a first period and the second period is lengthened as a voltage between the pair of electrodes is increased; and
an optical modulator that modulates light which is output from the discharge lamp according to image data.

8. A light source drive method comprising:
supplying a high-frequency first drive signal to a discharge lamp that has a pair of electrodes during a first period;
detecting a voltage between the pair of electrodes;
supplying a second drive signal whose frequency is lower than a frequency of the first drive signal for a second period; and determining the second period based on the voltage between the pair of electrodes so that the second period is lengthened as the voltage between the pair of electrodes is increased.

* * * * *